Figure 1:
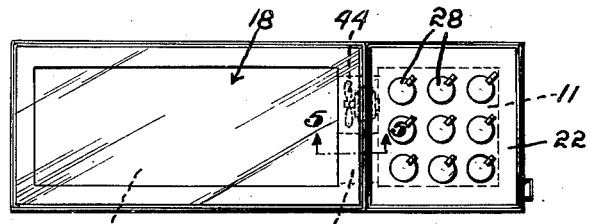

July 30, 1957 L. KONDOS 2,800,774
REFRIGERATED CABINET
Filed May 29, 1952

INVENTOR.
Louis Kondos,
BY
ATTORNEY

United States Patent Office 2,800,774
Patented July 30, 1957

2,800,774
REFRIGERATED CABINET
Louis Kondos, Bath, Maine

Application May 29, 1952, Serial No. 290,683

1 Claim. (Cl. 62—102)

This invention relates to cabinets and particularly to a cabinet having an upwardly opening chamber closed by a cover provided with cap sealed ports and housing containers supported so that their ingredients are accessible through the ports.

While cabinets in accordance with the invention are adapted for a wide range of uses, they are peculiarly well adapted for use in the preparation of so-called Italian sandwiches. Such sandwiches contain several ingredients and the usual practice is to maintain a supply of each ingredient ready for use. The problem is to have these supplies available for efficient sandwich preparation under attractive and sanitary conditions.

In accordance with the invention, a cabinet includes a base having an upwardly opening chamber in which supplies of the ingredients to be used are stored in open-mouthed containers. The chamber is closed by a cover having ports closed by caps that are preferably transparent and means are employed to effect a resiliently seated relation between the mouth of each container and a gasketed port shoulder thereby to seal each port and the interiors of the containers from the chamber which is usually held at a suitably low temperature by a refrigerator unit located below the chamber.

The cabinet preferably includes an integral part providing a storage space for additional filled containers, bulk supplies of the ingredients, and completed sandwiches. This part of the cabinet may have a flat glass top providing a working shelf or counter and permitting stored contents to be readily seen. Cold air is circulated from the chamber through the storage space and back to the chamber.

Cabinets in accordance with the invention thus provide means for storing, under sanitary and attractive conditions, food products and ingredients thereof for efficient preparation of sandwiches. While the invention is herein discussed with particular reference to the production of Italian sandwiches, its adaptability to other uses will be apparent as where the contents of a number of containers must be readily accessible.

In the accompanying drawings, the embodiment of the invention is a cabinet for use in Italian sandwich preparation as that use well illustrates its several novel features and advantages.

Figure 2:
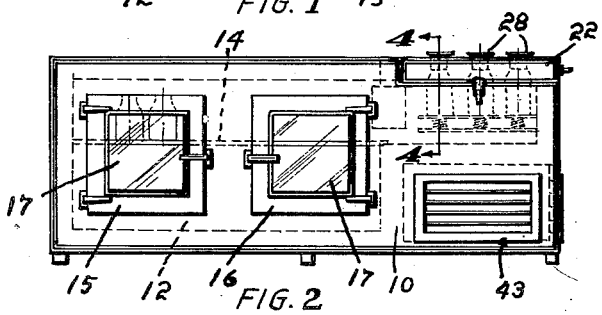
Figure 3:
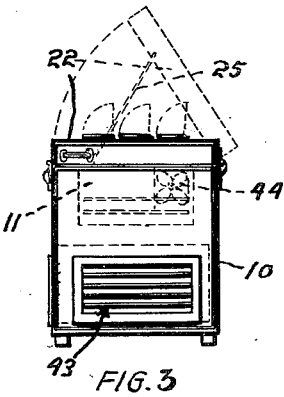
Figures 4, 5:
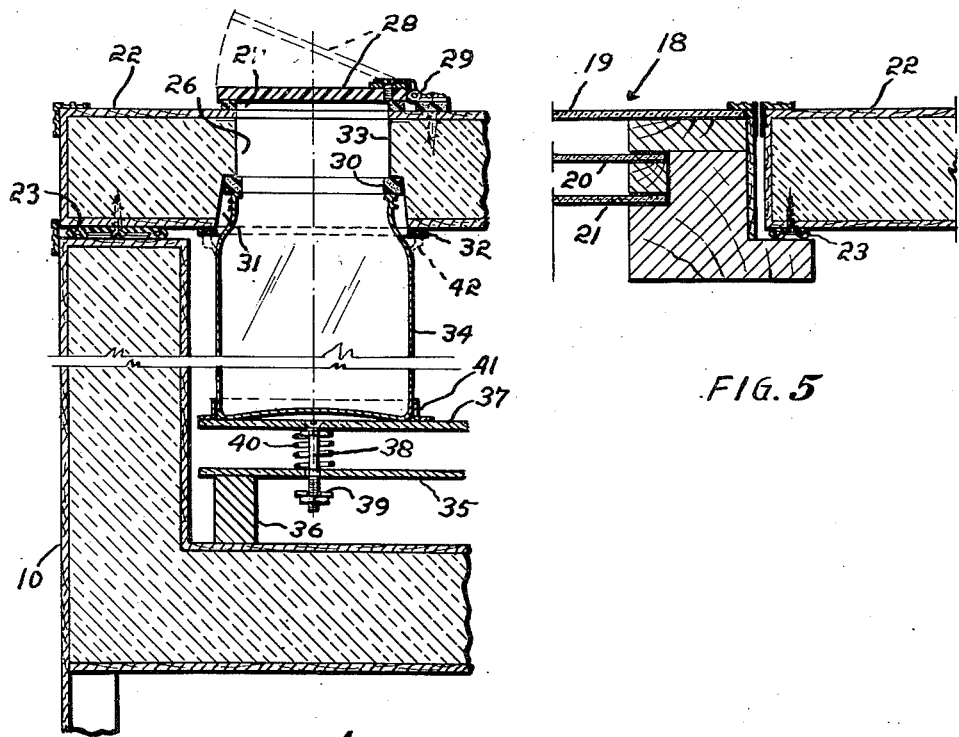

In the drawings:

Fig. 1 is a plan view of the cabinet,
Fig. 2 is a front view thereof,
Fig. 3 is a view of the cabinet as seen from its right hand end,
Fig. 4 is a view, on an enlarged scale, along the indicated lines 4—4 of Fig. 2, and
Fig. 5 is a fragmentary view, on a similarly enlarged scale, along the indicated lines 5—5 of Fig. 1.

The cabinet shown in the drawings consists of a thermally insulated base 10 having at one end an upwardly opening chamber 11 and a substantially longer storage compartment 12 with a passageway 13 effecting communication therebetween.

The storage compartment 12 has a shelf 14 and doors 15 and 16 having multiple-glazed windows 17 and is closed by a glass top generally indicated at 18 and providing a flat counterlike working space where sandwiches or other food products may conveniently be prepared. Preferably the top 18 consists of three vertically spaced glass panes 19, 20, and 21 as shown in Fig. 5.

The chamber 11 is provided with a hinged, thermally insulated cover 22 provided with marginal gaskets 23 engageable with the upper edges of the base 10 to afford a seal when the cover is closed and locked by a suitable clasp 24. A conventional stay 25 holds the cover when it has been raised to its open position.

The cover 22 has a plurality of ports 26 extending vertically therethrough. Each of these ports has an external gasket 27 anchored to the upper surface of the cover 22 and engageable by a cap 28 attached to the cover 22 as by a hinge 29. Preferably the caps 28 are formed from transparent plastic stock. Each port 26 is shown as having a gasketed shoulder 30 and a downwardly and outwardly tapering lower part 31 surrounded by a gasket 32 secured to the bottom surface of the cover 22. Preferably, each port 26 is provided with a metal lining 33.

In the chamber 11 are located the means for supporting the containers 34. These means, as may best be seen in Fig. 4, are shown as consisting of a plate 35 supported at a desired height by blocks 36 which are preferably of the type that are vertically adjustable. The container supporting shelf 37 carries a plurality of bolts 38 extending downwardly freely through bores in the plate 35 and to the extremity of each of them is attached a nut anchored washer 39 providing an adjustable stop. Interposed between the plate 35 and the shelf 37 are compression springs 40 held in position by the bolts 38.

The shelf 37 is provided with a plurality of annular container receiving seats 41, there being one such seat below each port 26 when the cover 22 is closed. The springs 40 are selected to be capable of yieldably supporting the weight of the containers 34 when full and to ensure that their mouths are tightly sealed against the shoulders 30. The gaskets 32 are effective to engage with mouths 42 of containers of a somewhat different size and shape. The arrangement of mouth-engaging gasketed seats is obviously dependent on the range in container sizes and shapes that are to be used. Where, as is usually the case, the mouths of the containers extend upwardly into the cover ports 26, the tapered parts 31 have the function of providing the clearance necessary when the cover 22 is swung into or out of its closed position and of assisting in centering the container mouths against the gasketed seats.

In the embodiment of the invention shown in the drawings, the cabinet is provided with a refrigerator unit, indicated generally at 43, and located directly below the chamber 11. The refrigerator unit 43 may be of any desired type and it functions to maintain the chamber 11 at a suitably low temperature. At one side of the passageway 13 there is located a fan unit 44 which serves to deliver cold air into the storage compartment 12 while the remainder of the passageway 13 is available for the return flow of air to the chamber 11.

In use, the shelf 14 is used to store reserve containers and sandwiches that have been prepared while the space below shelf 14 is available for the bulk storage of various ingredients. These are visible through the glass top 18 as well as through the doors 15 and 16.

In sandwich preparation, the attendant can quickly and easily remove the necessary amounts of the desired ingredients from the containers in the chamber 11 and use them in completing a sandwich on the counter established by the glass top 18. Since the contents of the container in use are visible to him, the adequacy of the supplies is always apparent. Empty containers in the chamber 11 are quickly and easily removed and replaced from the reserves in the storage compartment 12 so that efficiency in sandwich preparation is ensured.

It will be apparent that a cabinet in accordance with the invention not only establishes sanitary conditions but invites the maintenance of those conditions. Open containers in the chamber 11 are sealed from each other and from the chamber 11 and the fact that the contents of the chamber 11 and the storage compartment 12 are visible makes it necessary to keep them attractively and invitingly displayed.

What I therefore claim and desire to secure by Letters Patent is:

A cabinet comprising a base having an upwardly opening chamber and a laterally spaced storage compartment arranged side by side a passageway effecting communication therebetween, a refrigerator unit located in said base below said chamber and operative to refrigerate its contents, and means in said passageway for circulating air from said chamber to said compartment and subdividing said passageway to provide a conduit for air returning back to said chamber, a flat transparent top for said compartment, a hinged cover member for said chamber having a plurality of ports extending therethrough, a gasketed seat associated with each port, a cap closing each port, a shelf member in said chamber for supporting an open mouthed container below each port, and yieldable means associated with one of said members yieldably maintaining the container mouths in engagement with said seats.

References Cited in the file of this patent

UNITED STATES PATENTS

| | | |
|---|---|---|
| 1,501,227 | Marsh | July 15, 1924 |
| 1,948,937 | De Muth | Feb. 27, 1934 |
| 2,281,430 | Grant | Apr. 28, 1942 |
| 2,340,723 | Williams et al. | Feb. 1, 1944 |
| 2,422,350 | Gross | June 17, 1947 |
| 2,462,279 | Passman | Feb. 22, 1949 |
| 2,489,009 | Corhanidis | Nov. 22, 1949 |
| 2,504,372 | Anderson | Apr. 18, 1950 |